Patented Feb. 16, 1937

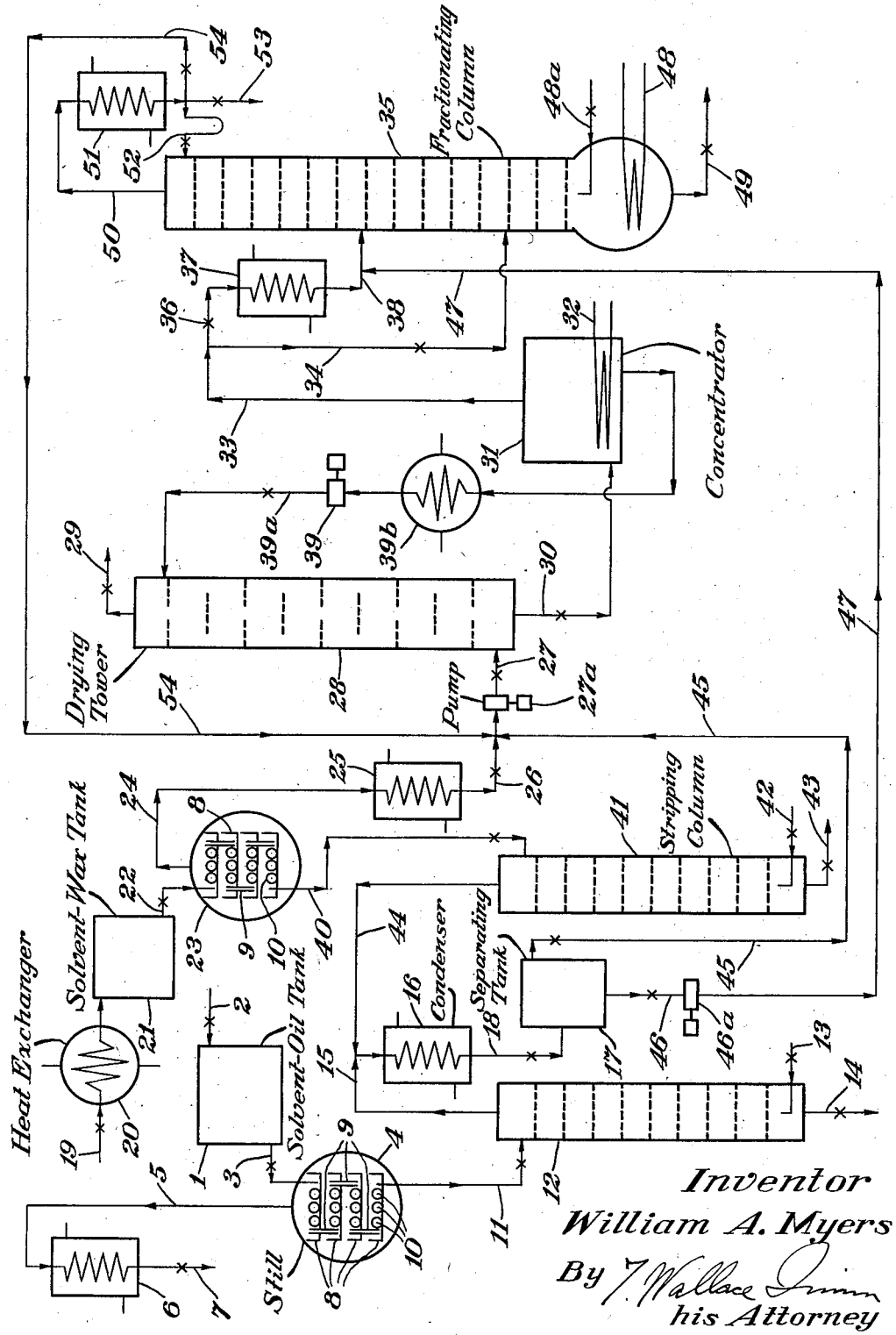

2,070,611

UNITED STATES PATENT OFFICE 2,070,611

SOLVENT RECOVERY

William A. Myers, Springfield, Pa., assignor to The Atlantic Refining Company, Philadelphia, Pa., a corporation of Pennsylvania Application August 22, 1934, Serial No. 740,898

3 Claims. (Cl. 202—39)

The present invention relates to a method for recovering substantially water-free solvent from operations involving the employment of a solvent or mixture of solvents which is completely miscible or only partially miscible with water.

More particularly, this invention relates to the recovery of substantially water-free solvent from hydrocarbon oil and wax fractions produced by dewaxing an oil-wax mixture containing small quantities of water, in the presence of one or a mixture of solvents which is partially or totally miscible with water, for example, solvents such as acetone or acetone-benzol.

Hydrocarbon oil-wax mixtures, in general, contain water in small amounts, and in the solvent dewaxing of such mixtures, which involves chilling, the bulk of the water usually appears in the wax fraction, together with residual solvent. In order to utilize the solvent recovered from the oil and/or wax fractions for treating fresh oil-wax mixtures, it is necessary to remove as completely as possible such water as is carried over with the solvent during the recovery operation, so that water will not accumulate in the system.

In the dewaxing of oils, employing, for example, the conventional acetone-benzol process as disclosed in U. S. Patent #1,802,942, it is the usual practice to employ a drying agent, such as concentrated sodium carbonate solution, for drying the acetone and benzol removed from the oil and wax fractions by distillation. In general, the solvent containing small quantities of water is contacted with the solution of drying agent until the drying solution becomes so dilute that no further water is absorbed from the solvent. At such time a portion of the diluted solution is discarded and fresh concentrated solution is added to the remainder in order to maintain the absorption capacity of the agent at the proper level. Furthermore, in discarding a portion of the diluted solution, an appreciable quantity of solvent is lost, inasmuch as such diluted solution is saturated with solvent at the temperature at which such solution is withdrawn from the system.

In order to recover substantially water-free solvent from the dewaxed oil and/or wax fractions, with a minimum loss of solvent and drying agent, I purpose to carry out the process hereinafter described, and illustrated with reference to the accompanying drawing.

Dewaxed oil, in solution in acetone-benzol, is delivered from the filter press of a dewaxing system to storage tank 1 by means of valve-controlled pipe 2. Such solution is passed, by means of valve-controlled pipe 3, to a primary distilling vessel 4 wherein the bulk of the relatively dry acetone-benzol is vaporized from the oil and passed from the vessel through pipe 5 to condenser 6. The condensate therefrom is passed to storage (not shown) by means of valve-controlled pipe 7.

The primary distilling vessel 4 may be provided with evaporating trays 8 connected by down-pipes 9 and heated by means of tubes 10 which conduct a heating fluid, such as steam, in indirect heat exchange relation with the liquid to be distilled. The oil, from which the bulk of the solvent has been distilled, is passed from vessel 4 through valve-controlled pipe 11 into the upper section of stripping column 12. Steam is introduced into the lower section of column 12 through valve-controlled pipe 13, and the descending oil is stripped of any residual solvent and is then withdrawn from the column by means of valve-controlled pipe 14. Solvent vapors, i. e., acetone-benzol, and steam are passed from the top of column 12 through pipe 15, condensed in condenser 16, and passed into separator 17 by means of valve-controlled pipe 18. Herein, benzol separates as the upper layer and water containing acetone as the lower layer.

Referring now to the primary wax distilling operation, the chilled wax containing acetone-benzol and water is passed from a filter pressing operation through valve-controlled pipe 19 and heat exchanger 20, wherein it is rendered more fluid. The heated mixture is then passed into storage vessel 21 from which it is continuously fed to the primary distilling vessel 23 by means of valve-controlled pipe 22. Vessel 23 is similar to vessel 4, like parts being similarly numbered. In distilling vessel 23, the bulk of the acetone-benzol and water is vaporized from the wax and passed from the vessel through pipe 24 to condenser 25. The condensate therefrom, comprising a mixture of acetone-benzol and water, is passed through valve-controlled pipe 26, pump 27a and pipe 27 into a drying tower 28 containing a drying agent, for example, a concentrated solution of sodium carbonate. Countercurrent contacting of the wet solvent and the drying solution is effected herein, relatively water-free acetone-benzol being withdrawn from the top of the tower through valve-controlled pipe 29, while the diluted drying solution, containing dissolved solvent, is drawn from the bottom of the tower and passed by means of valve-controlled pipe 30 into a concentrating or distilling vessel 31 provided with heating coil 32. In the distilling vessel 31, the diluted drying solution is concentrated, the vapors of water and solvent being passed therefrom through pipe 33 and thence through valve-controlled pipe 34 into fractionating tower 35. Alternatively, the water and solvent vapors may be passed through pipe 33 and valve 36 to condenser 37, and the condensate therefrom may be passed by means of pipe 38 into column 35. The concentrated drying solution, withdrawn from the distilling vessel 31 is passed through cooling coil 39b and is then recirculated to the top of the drying tower 28 through valve-controlled pipe 39a, by means of pump 39.

Referring again to the primary wax distilling operation, the molten wax from which the bulk of the solvent and water has been removed in distilling vessel 23, is passed from vessel 23 through valve-controlled pipe 40 into stripping column 41. Steam is introduced into the lower section of column 41 through valve-controlled pipe 42, and the descending wax is stripped of any residual solvent and water. The stripped wax, substantially free of solvent and water is withdrawn from the column by means of valve-controlled pipe 43 and passed to storage (not shown), while the solvent vapors, i. e., acetone-benzol, and steam are passed from the top of column 41 through pipe 44, to be condensed in condenser 16 and thereafter introduced into separator 17 by means of valve-controlled pipe 18.

The condensed mixture of solvent and water from the oil stripping column 12 and from the wax stripping column 41 is allowed to settle and stratify into layers in separator 17, whereupon the wet benzol is withdrawn from the upper portion of the separator and passed by means of valve-controlled pipe 45 to pipe 27, and thence into the drying tower 28, wherein it is contacted with a solution of drying agent and thereby freed of water.

From the bottom of separator 17 there is withdrawn an aqueous solution of acetone which is passed by means of valve-controlled pipe 46, pump 46a and pipe 47 to pipe 38 and thence into the fractionating column 35, which is provided with a heating coil 48 and a valve-controlled steam line 48a. The aqueous solution of acetone from separator 17 and the solvent and water vapors or condensate from the concentrating or distilling vessel 31 are separated by fractionation in column 35, into relatively dry solvent and solvent-free water. The latter is withdrawn from the lower end of the column through valve-controlled pipe 49, while the relatively dry solvent, comprising for the greater part acetone, is passed as vapor from the top of the column by means of pipe 50 to condenser 51, wherein the solvent is condensed. A portion of such condensate may be returned as reflux to column 35 by means of valve-controlled pipe 52, while the remainder may be withdrawn from the system through valve-controlled pipe 53. If the condensate has not been freed of water to the desired extent by fractionation, it may be passed from the condenser 51 through valve-controlled pipe 54 to pipe 27 and thence into drying tower 28, wherein it is further dried and discharged by means of valve-controlled pipe 29.

Preferably, all of the solvent recovered from the oil and wax fractions is passed, at some stage, into contact with the drying solution, thereby insuring substantial dehydration.

It will be seen, in the system above described, that substantially complete recovery of all of the solvent may be effected and at the same time, due to recirculation of the drying solution, little or no fresh drying agent need be added.

While I have described my process in connection with the recovery and dehydration of mixed solvents such as acetone-benzol, I contemplate as within the scope of my invention, the treatment of any solvent which is partially or totally miscible with water, for example, methyl ethyl ketone, methyl acetate and butanol. Furthermore, while sodium carbonate solution has been given as an exemplary drying agent, I do not intend to limit myself thereto but may employ any drying or dehydrating agent which will preferentially absorb water from a solvent without reacting therewith, for example, concentrated calcium chloride solution.

What I claim is:

1. The method of recovering substantially water-free acetone-benzol from oil and wax fractions produced by dewaxing an oil-wax mixture containing traces of water with a mixture of acetone and benzol, which comprises separately heating, by indirect heat exchange with steam, the oil containing acetone-benzol and the wax containing acetone-benzol and water to vaporize the bulk of these contained materials from the oil and wax respectively, separately condensing the vapors evolved from the oil and wax fractions, passing the condensate from the wax through a body of an aqueous solution of a drying agent, conducting the thus dried acetone-benzol and the condensate from the oil from the recovery system, passing the oil and wax fractions partially freed from acetone-benzol into separate stripping zones in direct contact with steam, condensing the steam and acetone-benzol vapors from the stripping operations, separating the benzol from the condensed water containing acetone, continuously passing a portion of the solution of drying agent containing acetone to a distilling zone, passing vapors of water and acetone therefrom to a fractionating zone, returning a concentrated solution of drying agent from the distilling zone to said body of drying agent, introducing into said fractionating zone the condensed water containing acetone resulting from the stripping operations, fractionating the mixture to produce substantially dry acetone and water substantially free of acetone, condensing vapors of the acetone so produced and returning at least a portion of said acetone as reflux to the fractionating zone.

2. The method of recovering substantially water-free acetone-benzol from oil and wax fractions produced by dewaxing an oil-wax mixture containing traces of water with a mixture of acetone and benzol, which comprises separately heating, by indirect heat exchange with steam, the oil containing acetone-benzol and the wax containing acetone-benzol and water to vaporize the bulk of these contained materials from the oil and wax respectively, separately condensing the vapors evolved from the oil and wax fractions, passing the condensate from the wax through a body of an aqueous solution of a drying agent, conducting the thus dried acetone-benzol and the condensate from the oil from the recovery system, passing the oil and wax fractions partially freed from acetone-benzol into separate stripping zones in direct contact with steam, condensing the steam and acetone-benzol vapors from the stripping operations, separating the benzol from the condensed water containing acetone and passing separated benzol to said body of drying agent, continuously passing a portion of the solution of drying agent containing acetone to a distilling zone, passing vapors of water and acetone therefrom to a fractionating zone, returning a concentrated solution of drying agent from the distilling zone to said body of drying agent, introducing into said fractionating zone the condensed water containing acetone resulting from the stripping operations, fractionating the mixture to produce substantially dry acetone and water substantially free of acetone, condensing vapors of the acetone so produced and returning at least a portion of said acetone as reflux to the fractionating zone.

3. The method of recovering substantially water-free acetone-benzol from oil and wax fractions produced by dewaxing an oil-wax mixture containing traces of water with a mixture of acetone and benzol, which comprises separately heating by indirect heat exchange with steam, the oil containing acetone-benzol and the wax containing acetone-benzol and water to vaporize the bulk of these contained materials from the oil and wax respectively, separately condensing the vapors evolved from the oil and wax fractions, passing the condensate from the wax through a body of an aqueous solution of a drying agent, conducting the thus dried acetone-benzol and the condensate from the oil from the recovery system, passing the oil and wax fractions partially freed from acetone-benzol into separate stripping zones in direct contact with steam, condensing the steam and acetone-benzol vapors from the stripping operations, separating the benzol from the condensed water containing acetone, continuously passing a portion of the solution of drying agent containing acetone to a distilling zone, vaporizing the water and acetone components therefrom, passing the water and acetone to a fractionating zone, returning a concentrated solution of drying agent from the distilling zone to said body of drying agent, introducing into said fractionating zone the condensed water containing acetone resulting from the stripping operations, fractionating the mixture to produce substantially dry acetone and water substantially free of acetone, condensing vapors of the acetone so produced and returning at least a portion of said acetone as reflux to the fractionating zone.

WILLIAM A. MYERS.